United States Patent
Yamaguchi et al.

(10) Patent No.: US 6,534,622 B2
(45) Date of Patent: Mar. 18, 2003

(54) PROCESS FOR PRODUCTION OF POLYIMIDE POWDER, POLYIMIDE POWDER, POLYIMIDE POWDER MOLDED BODIES AND PROCESS FOR THEIR PRODUCTION

(75) Inventors: Hiroaki Yamaguchi, Tokyo (JP); Fumio Aoki, Ichihara (JP)

(73) Assignee: Ube Industries, Ltd., Ube (JP)

( * ) Notice: Subject to any disclaimer, the term of this patent is extended or adjusted under 35 U.S.C. 154(b) by 0 days.

(21) Appl. No.: 09/984,235

(22) Filed: Oct. 29, 2001

(65) Prior Publication Data
US 2002/0052463 A1 May 2, 2002

(30) Foreign Application Priority Data
Oct. 31, 2000 (JP) ........................................ 2000-332278

(51) Int. Cl.$^7$ ........................ C08G 73/10; B32B 27/00; B29C 43/00
(52) U.S. Cl. ........................ 528/170; 528/125; 528/126; 528/128; 528/172; 528/173; 528/176; 528/179; 528/183; 528/188; 528/220; 528/229; 528/350; 528/351; 528/353; 264/319; 264/320; 264/325; 428/402; 428/473.5
(58) Field of Search .................. 428/402, 473.5; 528/125, 126, 128, 172, 173, 176, 179, 183, 188, 220, 229, 350, 351, 353, 170; 264/319, 320, 325

(56) References Cited

U.S. PATENT DOCUMENTS

| 4,464,489 A | * | 8/1984 | Noda et al. ................. 528/353 |
| 4,755,428 A | | 7/1988 | Noda et al. ................. 428/402 |
| 5,589,111 A | * | 12/1996 | Haruta et al. ................. 264/8 |
| 5,898,048 A | | 4/1999 | Yamaguchi et al. ......... 528/353 |
| 2002/0030299 A1 | * | 3/2002 | Tsumiyama ................... 264/85 |
| 2002/0037995 A1 | * | 3/2002 | Tsumiyama ................. 528/480 |
| 2002/0052464 A1 | * | 5/2002 | Yamaguchi et al. ......... 528/353 |

FOREIGN PATENT DOCUMENTS

| JP | 61241326 A | 10/1986 |
| JP | 07033873 A | 2/1995 |
| JP | 10045918 A | 2/1998 |

* cited by examiner

Primary Examiner—P. Hampton-Hightower
(74) Attorney, Agent, or Firm—Morgan, Lewis & Bockius LLP

(57) ABSTRACT

A process for production of polyimide powder, which comprises reacting an aromatic diamine with a partial ester of a biphenyltetracarboxylic dianhydride, which is a partial ester of a biphenyltetracarboxylic dianhydride with a primary alcohol of 1–5 carbon atoms of which at least 30 mole percent is a 2,3,3',4'-biphenyltetracarboxylic acid component, in the presence of the primary alcohol, separating out and collecting the resulting solid polyimide precursor and heating for dehydrating ring closure, polyimide powder obtained thereby, molded bodies of the polyimide powder, and a process for production of the molded bodies.

9 Claims, No Drawings

PROCESS FOR PRODUCTION OF POLYIMIDE POWDER, POLYIMIDE POWDER, POLYIMIDE POWDER MOLDED BODIES AND PROCESS FOR THEIR PRODUCTION

BACKGROUND OF THE INVENTION

1. Field of the Invention

The present invention relates to polyimide powder which contains a 2,3,3',4'-biphenyltetracarboxylic acid component as an essential component and gives polyimide powder molded bodies that maintain a high level of heat resistance with particularly high flexural strength and tensile strength and high elongation, as well as to polyimide powder molded bodies and to a process for their production.

2. Description of the Related Art

Pyromellitic acid-based polyimide powder molded bodies obtained from a pyromellitic acid component and 4,4'-diaminodiphenyl ether have been widely used in the prior art as polyimide powder molded bodies because of their high toughness and satisfactory cutting workability.

However, pyromellitic acid-based polyimide molded bodies have high moisture absorption, considerable out gas and low chemical resistance and dimensional stability.

3,3',4,4'-biphenyltetracarboxylic acid-based polyimide powder molded bodies have therefore been proposed.

Examples of such 3,3',4,4'-biphenyltetracarboxylic acid-based polyimide powder molded bodies are described, for example, in Japanese Unexamined Patent Publication No. 57-200453, wherein there are obtained heated/compressed molded bodies of relatively large-sized aromatic polyimide powder with an imidation rate of 95% or greater obtained by polymerization and imidation of a 3,3',4,4'-biphenyltetracarboxylic acid component and an aromatic diamine component in N-methyl-2-pyrrolidone.

Also, processes for production of aromatic polyimide powder molded bodies comprising a 3,3',4,4'-biphenyltetracarboxylic acid component and para-phenylenediamine are described in Japanese Unexamined Patent Publication No. 61-241326 and Japanese Unexamined Patent Publication No. 1-266134.

However, although the processes described in the aforementioned publications are effective for production of polyimide powder comprising a 3,3',4,4'-biphenyltetracarboxylic acid component and less than 30 mole percent of a 2,3,3',4'-biphenyltetracarboxylic acid component and a para-phenylenediamine component, polyimides comprising, for example, a 2,3,3',4'-biphenyltetracarboxylic acid component and a para-phenylenediamine component undergo gel precipitation when subjected to heated dehydrating ring closure in amide-based solvents, and with time become thoroughly lumpy and impossible to stir. Moreover, the molded bodies obtained from powder formed by crushing are brittle.

BRIEF SUMMARY OF THE INVENTION

It is therefore an object of the present invention to provide polyimide powder molded bodies which contain a 2,3,3',4'-biphenyltetracarboxylic acid component as an essential component and which exhibit both excellent heat resistance and satisfactory mechanical properties, polyimide powder as the starting material therefor, and a process for their production.

In other words, the invention provides a process for production of polyimide powder obtained by reacting an aromatic diamine with a partial ester of a biphenyltetracarboxylic dianhydride, which is a partial ester of a biphenyltetracarboxylic dianhydride with a primary alcohol of 1–5 carbon atoms of which at least 30 mole percent and especially at least 50 mole percent is a 2,3,3',4'-biphenyltetracarboxylic acid component, in the presence of the primary alcohol, separating out and collecting the resulting solid polyimide precursor, and preferably heating at 150–300° C. for dehydrating ring closure.

The invention further provides polyimide powder obtained by the aforementioned process.

The invention still further provides biphenyltetracarboxylic acid-based polyimide powder molded bodies having a density of at least 1.3 g/mm$^3$, a tensile strength of at least 800 Kg/cm$^2$ and a tensile break elongation of at least 10%, obtained by subjecting the aforementioned polyimide powder to heat and pressure in a die either simultaneously or separately.

The invention still further provides a process for production of polyimide powder molded bodies whereby the aforementioned polyimide powder is packed into a die and subjected to heat in a range of about 300–600° C. and pressure in a range of about 100–10,000 Kg/cm$^2$ either simultaneously or separately for molding.

DETAILED DESCRIPTION OF THE INVENTION

Preferred embodiments of the invention.are listed below.

1) The aforementioned process for production of polyimide powder wherein the reaction is carried out in the presence of an imidazole.
2) The aforementioned process for production of polyimide powder molded bodies wherein the molding step is carried out by compression molding, wet CIP or dry CIP (CIP: Cold Isostatic Pressure) or HIP (HIP: Hot Isostatic Pressure).

According to the invention, the aromatic tetracarboxylic dianhydride component of the polyimide is 2,3,3',4'-biphenyltetracarboxylic dianhydride alone or a biphenyltetracarboxylic dianhydride comprising at least 30 mole percent and especially at least 50 mole percent of 2,3,3',4'-biphenyltetracarboxylic dianhydride and no greater than 70 mole percent and especially no greater than 50 mole percent of 3,3,4',4'-biphenyltetracarboxylic dianhydride.

Part of the biphenyltetracarboxylic dianhydride may be replaced with another aromatic tetracarboxylic dianhydride such as pyromellitic dianhydride, 3,3',4,4'-benzophenonetetracarboxylic dianhydride, 2,2'-bis(3,4-dicarboxyphenyl)propane dianhydride, bis(3,4-dicarboxyphenyl)methane dianhydride or bis(3,4-dicarboxyphenyl)ether dianhydride, so long as the effect of the invention is not hindered.

The diamine component used may be any aromatic diamine that gives a polyimide with a high Tg, such as para-phenylenediamine (p-phenylenediamine) or 4,4'-diaminodiphenyl ether.

According to the invention, it is necessary to use a partial ester, and preferably a half ester, of the aforementioned aromatic tetracarboxylic dianhydride with a primary alcohol of 1–5 carbon atoms such as methanol, ethanol, propanol, butanol or the like, and especially methanol.

The primary alcohol of 1–5 carbon atoms for the partial esterification is preferably used as the partial esterification solvent for the aromatic tetracarboxylic dianhydride.

In this case, the amount of the lower alcohol is preferably such that the total of the aromatic tetracarboxylic dianhydride and the diamine in the solution is 1–60 wt %.

Also, another solvent and the lower alcohol used for partial esterification may be used in admixture.

As suitable solvents there may be mentioned ketones and ethers with boiling points of no higher than 120° C., such as acetone, tetrahydrofuran and the like.

In this case, the amount of the lower alcohol is preferably a two-fold molar amount with respect to the aromatic tetracarboxylic dianhydride.

In the process of the invention, the aromatic tetracarboxylic dianhydride and the primary alcohol of 1–5 carbon atoms are preferably reacted under total reflux conditions for partial esterification, and especially half-esterification of the aromatic tetracarboxylic dianhydride, after which the resulting solution may be cooled, the aromatic tetracarboxylic acid component and an approximately equimolar amount of the aromatic diamine added thereto and reacted, and the solid polyimide precursor separated and collected from the reaction solution and then heated preferably at 150–300° C. for dehydrating ring closure to obtain polyimide powder.

The method of separating and collecting the solid polyimide precursor is not particularly restricted, and for example, solvent removal from the reaction solution may be carried out using an evaporator, a spray drier, distillation or the like.

In this case, the solvent removal temperature is preferably no higher than 250° C. and especially no higher than 120° C.

The imidation rate is preferably controlled by adding an imidation catalyst, and preferably an imidazole-based imidation catalyst, to the reaction system before the dehydrating ring closure and carrying out the imidation under the aforementioned heated conditions.

As examples of imidation catalysts there may be mentioned imidazole and imidazole-based compounds such as 2-methylimidazole, 1,2-dimethylimidazole and 2-phenylimidazole.

According to the invention, polyimide powder may be obtained by heating the aforementioned polyimide precursor powder to an imidation rate of 90% or greater.

The heating may be carried out at no higher than 300° C. under either normal pressure or reduced pressure, and especially at no higher than 250° C., to produce a dry state with a weight reduction of preferably no greater than 2% and especially no greater than 1.5% with heating for one hour at 350° C.

According to the invention, the aforementioned polyimide powder is packed into a die and subjected to heat in a range of about 300–600° C. and pressure in a range of about 100–10,000 Kg/cm$^2$ either simultaneously or separately to form a polyimide powder molded body.

The molding step may be accomplished by compression molding, wet CIP or dry CIP (CIP: Cold Isostatic Pressure) or HIP (HIP: Hot Isostatic Pressure).

The aforementioned methods can give a biphenyltetracarboxylic acid-based polyimide powder molded body having a density of at least 1.3 g/mm$^3$, preferably a glass transition temperature of 300° C. or higher, a tensile strength of at least 800 Kg/cm$^2$ and a tensile break elongation of at least 10%.

For production of the aforementioned powder molded body, a filler of any type, for example, an inorganic filler such as artificial diamond, silica, mica, kaolin, boron nitride, aluminum oxide, iron oxide, graphite, molybdenum sulfide or iron sulfide, or an organic filler such as a fluorine resin, may be mixed with the polyimide powder.

The filler addition may be accomplished by mixing using any internal addition or external addition method.

Polyimide molded bodies obtained by the process of the invention are polyimide powder molded bodies that contain 2,3,3',4'-biphenyltetracarboxylic dianhydride component at 30 mole percent or greater but exhibit good uniformity, satisfactory elongation and high productivity without loss of excellent heat resistance and dimensional stability.

The abbreviations used in the descriptions which follow refer to the compounds listed below.

In the examples, the glass transition temperature (Tg) of each polyimide is the value measured with an SSC5200 RDSC220C by Seiko Instruments Co., Ltd. at a temperature elevating rate of 10° C.

a-BPDA: 2,3,3',4'-biphenyltetracarboxylic dianhydride
s-BPDA: 3,3',4,4'-biphenyltetracarboxylic dianhydride
PPD: p-phenylenediamine
ODA: 4,4'-diaminodiphenyl ether
DMZ: 1,2-dimethylimidazole
NMP: N-methyl-2-pyrrolidone

EXAMPLE 1

In a 500 ml volume four-necked separable flask equipped with a stirrer, reflux condenser and thermometer there were charged 58.8 g (200 millimoles) of a-BPDA, 75 g of methanol (MeOH) and 2.4 g of DMZ as a catalyst, and the mixture was heated and stirred for 60 minutes while refluxing to make a uniform solution.

The reaction solution was then cooled to 60° C., and 21.6 g (200 millimoles) of PPD and 77.1 g of MeOH were added and stirred to produce a uniform solution which was then cooled to room temperature and sprayed into a 120° C. chamber at a rate of 20 g/minute using a spray drier (GS310 by Yamato Chemical Co., Ltd.) to obtain powder. The powder was then heated at 120° C. for 5 hours, 150° C. for 5 hours and 180° C. for 10 hours to obtain 69.5 g (95.0%) of polyimide powder.

The polyimide powder was packed into a 50 mmφ die for premolding at room temperature and a pressure of 200 Kg/cm$^2$, and after removing the premolded body from the die and free sintering at 450° C. for 30 minutes, a pressure of 250 Kg/cm$^2$ was applied to the sintered body and maintained at 450° C. for 30 minutes. The heating was then halted for cooling while maintaining the pressure, and the molded body was removed when the temperature fell below 300° C. The density of the molded body was 1.37 g/cc and the Tg was 412° C. Upon measurement of the tensile strength, elongation, flexural strength and flexural modulus of the molded body at 23° C. according to ASTM D-638 and D790, the tensile strength was 900 Kg/cm$^2$, the tensile break elongation was 20%, the flexural strength was 1100 Kg/cm$^2$ and the flexural modulus was 33,000 Kg/cm$^2$.

EXAMPLE 2

After charging 58.8 g (200 millimoles) of a-BPDA, 100 g of methanol (MeOH) and 2.7 g of DMZ as a catalyst in the same manner as Example 1, the mixture was heated and stirred for 60 minutes while refluxing to make a uniform solution.

The same procedure was followed as in Example 1 except that the reaction solution was then cooled to 60° C., 10.8 g (100 millimoles) of PPD, 20.0 g (100 millimoles) of ODA and 400 g of MeOH were added and stirred to produce a uniform solution, the MeOH was then removed with an evaporator and drying was effected for 12 hours in a vacuum at 60° C., to obtain 80.9 g (98.2%) of polyimide powder.

Molding was carried out in the same manner as Example 1, except that the polyimide powder was subjected to free sintering and hot compression at 350° C. and 400° C., respectively. The density of the molded body was 1.35 g/cm³ and the Tg was 362° C. The tensile strength was 1000 Kg/cm² and the tensile break elongation was 40%.

EXAMPLE 3

After charging 58.8 g (200 millimoles) of a-BPDA, 120 g of methanol (MeOH) and 3.0 g of DMZ as a catalyst in the same manner as Example 1, the mixture was heated and stirred for 60 minutes while refluxing to make a uniform solution.

The same procedure was followed as in Example 1 except that the reaction solution was then cooled to 60° C. and 40.0 g (200 millimoles) of ODA and 400 g of MeOH were added and stirred to produce a uniform solution, to obtain 87.3 g (95.3%) of polyimide powder.

Molding was carried out in the same manner as Example 1, except that the polyimide powder was subjected to free sintering and hot compression at 280° C. and 350° C., respectively. The density of the molded body was 1.32 g/cm³ and the Tg was 330° C. The tensile strength was 1000 Kg/cm², the tensile break elongation was 100%, the flexural strength was 1250 Kg/cm² and the flexural modulus was 27,400 Kg/cm².

COMPARATIVE EXAMPLE 1

After adding 4.32 g (40 millimoles) of PPD and 91.1 g of NMP into a 200 ml volume four-necked separable flask equipped with a stirrer, reflux condenser (with water separator) thermometer and nitrogen inlet tube at 60° C., 11.76 g (40 millimoles) of a-BPDA was added to the mixture while circulating nitrogen gas and stirring, and then the temperature was raised to 100° C. over about 20 minutes to prepare a solution with each monomer component uniformly dissolved in the NMP solvent. The solvent and produced water were refluxed while continuing the nitrogen gas circulation and stirring of the solution so that the produced water was removed, and upon raising the temperature to 190° C. over about 30 minutes a yellow gel was produced, with the entirety becoming lumpy and impossible to stir after 25 minutes. At that point, the reaction was suspended, the lump was collected and dried at 180° C. for 3 hours, and then the crushed polyimide powder was molded in the same manner as Example 1. The molded body had a tensile strength of 100 Kg/cm² and a tensile break elongation of 1%.

COMPARATIVE EXAMPLE 2

The procedure of Example 3 was carried out except for using s-BPDA, and upon adding ODA to the resulting S-BPDA and MeOH reaction solution, new crystals precipitated immediately preventing formation of a uniform solution. The MeOH was removed from the suspension with an evaporator, and after 12 hours of drying in a vacuum at 60° C., the product was crushed and subjected to dehydrating ring closure reaction and molding in the same manner as Example 1. The molded body was brittle and its mechanical properties were unmeasurable.

The present invention having the construction described in detail above exhibits the following effects.

According to the process of the invention, it is possible to efficiently produce polyimide powder having good uniformity and mechanical properties without reduced heat resistance or dimensional stability.

The polyimide powder obtained by the process of the invention exhibits satisfactory workability.

Molded bodies obtained according to the invention exhibit satisfactory heat resistance, strength and elongation.

What is claimed is:

1. A process for production of polyimide powder which comprises reacting an aromatic diamine with a partial ester of a biphenyltetracarboxylic dianhydride, which is a partial ester of a biphenyltetracarboxylic dianhydride with a primary alcohol of 1–5 carbon atoms of which at least 30 mole percent is a 2,3,3',4'-biphenyltetracarboxylic acid component, in the presence of said primary alcohol, separating out and collecting the resulting solid polyimide precursor, and heating for dehydrating ring closure.

2. The process of claim 1, wherein the reaction is performed in the presence of an imidazole.

3. The process of claim 1, wherein the dehydrating ring closure is accomplished by heating at 150–300° C.

4. The process of claim 1, wherein the 2,3,3',4'-biphenyltetracarboxylic acid component comprises at least 50 mole percent of the partial ester of the biphenyltetracarboxylic dianhydride.

5. The process of claim 1, wherein the primary alcohol is selected from among methanol, ethanol, propanol and butanol.

6. A polyimide powder derived from the process of any one of claims 1 to 5.

7. A biphenyltetracarboxylic acid-based polyimide powder molded body having a density of at least 1.3 g/mm³, a tensile strength of at least 800 Kg/cm² and a tensile break elongation of at least 10%, derived from subjecting the polyimide powder according to claim 6 to heat and pressure in a die either simultaneously or separately.

8. A process for production of a polyimide powder molded body, whereby polyimide powder according to claim 6 is packed into a die and subjected to heat in a range of about 300–600° C. and pressure in a range of about 100–10,000 Kg/cm² either simultaneously or separately for molding.

9. The process of claim 8, wherein the molding step is performed by compression molding, wet CIP (CIP: Cold Isostatic Pressure), dry CIP or HIP (HIP: Hot Isostatic Pressure).

* * * * *